US011809890B2

(12) United States Patent
Yang

(10) Patent No.: US 11,809,890 B2
(45) Date of Patent: Nov. 7, 2023

(54) MANAGING QUALITY OF STORAGE SERVICE IN VIRTUAL NETWORK

(71) Applicant: INTEL CORPORATION, Santa Clara, CA (US)

(72) Inventor: Ziye Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 483 days.

(21) Appl. No.: 17/041,723

(22) PCT Filed: Jun. 29, 2018

(86) PCT No.: PCT/CN2018/093779
§ 371 (c)(1),
(2) Date: Sep. 25, 2020

(87) PCT Pub. No.: WO2020/000409
PCT Pub. Date: Jan. 2, 2020

(65) Prior Publication Data
US 2021/0081231 A1 Mar. 18, 2021

(51) Int. Cl.
*G06F 9/455* (2018.01)
*H04L 9/40* (2022.01)

(52) U.S. Cl.
CPC ...... *G06F 9/45558* (2013.01); *H04L 63/1425* (2013.01); *G06F 2009/45583* (2013.01);
(Continued)

(58) Field of Classification Search
CPC ....... G06F 9/45558; G06F 2009/45583; G06F 2009/45587; G06F 2009/45595;
(Continued)

(56) References Cited

U.S. PATENT DOCUMENTS 9,128,622 B1 * 9/2015 Yang .................. G06F 9/5077
2014/0317261 A1 10/2014 Shatzkamer et al.
(Continued)

FOREIGN PATENT DOCUMENTS

CN 101459569 6/2009
CN 105991438 10/2016
(Continued)

OTHER PUBLICATIONS

"Japanese Application Serial No. 2020-551374, Response filed Sep. 14, 2022 to Notification of Reasons for Refusal dated Jun. 21, 2022", w English Claims, 14 pgs.
(Continued)

*Primary Examiner* — Kenneth Tang
(74) *Attorney, Agent, or Firm* — Schwegman Lundberg & Woessner, P.A.

(57) ABSTRACT

Various systems and methods for managing quality of storage service in a virtual network are described herein. A system for managing quality of service in a virtual network includes an analytic platform configured to analyze input/output operations by a virtual host on a storage array in a virtual network, the virtual host identified with a virtual network identifier (VNI), and the virtual network identified by a virtual host address (VHA); and a security controller to: receive, from the analytic platform, storage array metrics associated with the VNI and the VHA; determine that the storage array metrics violate a threshold condition; and cause a responsive action to adjust the operating environment of the virtual host to maintain quality of input/output service for hosts sharing the storage array.

25 Claims, 4 Drawing Sheets

(52) U.S. Cl.
CPC ............. *G06F 2009/45587* (2013.01); *G06F 2009/45595* (2013.01)

(58) Field of Classification Search
CPC ...... G06F 3/061; G06F 3/0604; G06F 3/0646; G06F 3/0647; H04L 63/1425; H04L 43/20; H04L 43/08
See application file for complete search history.

(56) References Cited

U.S. PATENT DOCUMENTS

| | | |
|---|---|---|
| 2014/0359099 A1 | 12/2014 | Wang |
| 2015/0263986 A1 | 9/2015 | Park et al. |
| 2016/0021020 A1 | 1/2016 | Deguchi |
| 2016/0350173 A1 | 12/2016 | Ahad |
| 2017/0230242 A1 | 8/2017 | Hammer et al. |
| 2018/0295036 A1* | 10/2018 | Krishnamurthy ..... H04L 43/026 |
| 2019/0081869 A1* | 3/2019 | Wu ..................... H04L 41/0631 |
| 2019/0081879 A1* | 3/2019 | Wu ..................... H04L 41/0895 |
| 2019/0146707 A1* | 5/2019 | Fetik ......................... G06F 8/61 726/11 |
| 2020/0201662 A1* | 6/2020 | Chou ................. G06F 13/1642 |
| 2022/0027051 A1* | 1/2022 | Kant ..................... G06F 3/0605 |
| 2022/0334725 A1* | 10/2022 | Mertes ................. G06F 16/275 |

FOREIGN PATENT DOCUMENTS

| | | |
|---|---|---|
| CN | 106331210 | 1/2017 |
| CN | 107409091 | 11/2017 |
| CN | 110134542 | 8/2019 |
| JP | 2008206115 | 9/2008 |
| JP | 2016511474 | 4/2016 |
| JP | 2018045475 | 3/2018 |
| JP | 2018518762 | 7/2018 |
| WO | 2018029767 | 2/2018 |
| WO | 2020000409 | 1/2020 |

OTHER PUBLICATIONS

"International Application Serial No. PCT CN2018 093779, International Search Report dated Feb. 27, 2019", 3 pgs.

"International Application Serial No. PCT CN2018 093779, Written Opinion dated Feb. 27, 2019", 3 pgs.

Caraguay, Angel, "Monitoring and Discovery for Self-Organized Network Management in Virtualized and Software Defined Networks", Sensors 2017, 17(4), 731, (Mar. 31, 2017), 31 pages.

Chen, Min, "Enabling Technologies for Future Data Center Networking: A Primer", IEEE Network, vol. 27, Issue: 4, (Jul.-Aug. 2013), 8 pages.

Lopez, Lorena, "Key Technologies in the Context of Future Networks: Operational and Management Requirements", Future Internet 2017, 9, 1, (Dec. 22, 2016), 15 pages.

Santos, Jose, "Fog Computing: Enabling the Management and Orchestration of Smart City Applications in 5G Networks", Entropy 2018, 20(1), 4, (Dec. 23, 2017), 26 pages.

"International Application Serial No. PCT CN2018 093779, International Preliminary Report on Patentability dated Jan. 7, 2021", 5 pgs.

"Japanese Application Serial No. 2020-551374, Notification of Reasons for Refusal dated Jun. 21, 2022", w English translation, 4 pgs.

\* cited by examiner

MANAGING QUALITY OF STORAGE SERVICE IN VIRTUAL NETWORK

PRIORITY APPLICATION

This application is a U.S. National Stage Application under 35 U.S.C. 371 from International Application No. PCT/CN2018/093779, filed 29 Jun. 29, published as WO 2020/000409, which is incorporated herein by reference in its entirety.

TECHNICAL FIELD

Embodiments described herein generally relate to managing storage systems, and in particular, to systems and methods for managing quality of storage service in a virtual network.

BACKGROUND

In the past, network functions were provided with hardware appliances such as hubs, routers, gateways, etc. More recently, many network hardware functions have been virtualized for cloud computing models. Using generic hardware, virtual network functions (VNF) provide vast scalability.

In an internet-of-things (IoT) setting, many applications at the edge are deployed in virtual machines (VM) or containers, supported by virtualization techniques. The VMs are executing in a virtual network, which may be supported by Network Functions Virtualization (NFV) of Software Defined Network (SDN) technologies. In such a complicated environment, quality of service is difficult to achieve.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

In a virtualized computing environment, a physical machine is configured to implement the behavior of the virtual machine. The physical machine, often referred to as a "host" or "physical host", may be configured using software to implement multiple virtual machines (VMs), also referred to as "virtual hosts." A physical machine typically includes physical system hardware that typically includes one or more physical processors (PCPUs) and physical memory and various other physical devices, such as local storage and IO, for example. A virtual machine typically includes virtual system hardware that ordinarily includes one or more virtual CPUs (VCPUs), virtual memory, virtual storage, virtual IO, and one or more other virtual devices all of which may be implemented in software using known techniques to emulate corresponding physical components. A VM typically will include both virtual system hardware and guest system software including virtual drivers used for various virtual devices. One or more layers or co-resident software components comprising a virtualization intermediary, e.g. a virtual machine monitor (VMM), acts to instantiate and provision VMs and to allocate host machine resources dynamically and transparently among the multiple VMs so that their respective guest operating systems may each run multiple VCPUs concurrently on a single physical machine.

In a virtualized network environment, storage is integrated into a virtual network. Storage-related network traffic and application-related network traffic are mixed. For example, network communication between VMs/containers and storage systems (e.g., network file system (NFS)) co-exist with network communications among VMs/containers. Thus, the quality of service (QoS) delivered to the tenants in a virtual network is not only dependent on the storage system, but also related to the network management system and the computing management system. Thus, current storage service solutions do not solve the issues that arise in a complicated virtual network environment. What is needed is an improved orchestrator to manage storage QoS for virtual tenants, applications, containers, and other client systems.

Figure 1:
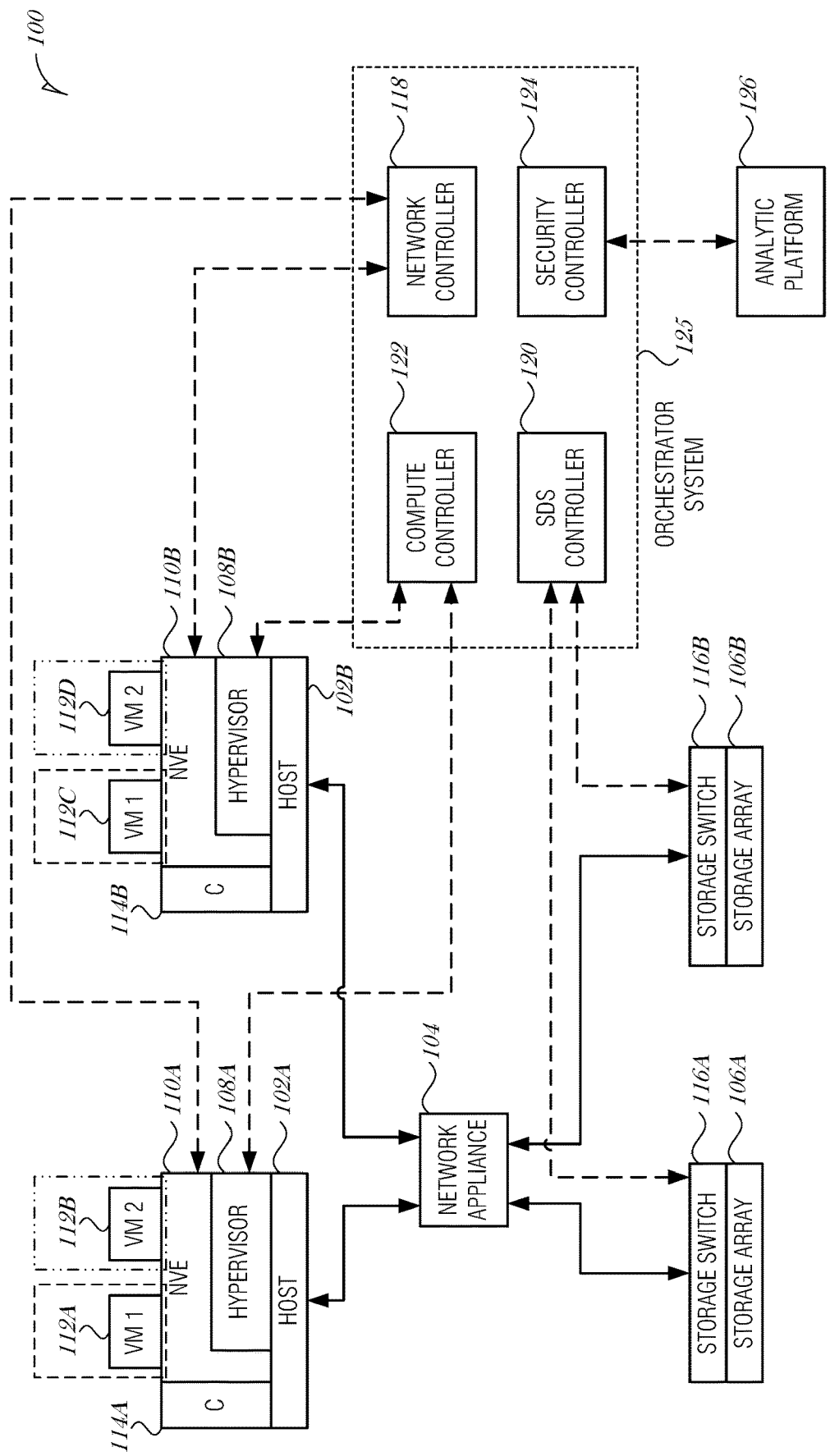
FIG. 1 is a block diagram illustrating an operating environment, according to an embodiment.

FIG. 1 is a block diagram illustrating an operating environment 100, according to an embodiment. The operating environment 100 includes two hosts 102A-B (collectively referred to as 102), which are connected via a network appliance 104 to two storage arrays 106A-B (collectively referred to as 106). The hosts 102 execute hypervisors 108A-B (collectively referred to as 108). Hypervisors 108 are an example of a virtualization infrastructure. The hypervisors run on physical infrastructure (e.g., hosts 102), which include processors, memory, communication circuitry, and the like.

Hypervisors 108 provide network virtualized edges (NVE) 110A-B (collectively referred to as 110). NVEs 110 provide a switching interface for virtual machines (VM) 112A-D (collectively referred to as 112). An NVE 110 is a virtualized network stack that works with the hypervisor 108 to provide virtualized network functionality. The NVE 110 is located in each host 102 and collaborates with the respective hypervisor 108 to encapsulate and decapsulate packets for the VM 112/container 114 in the virtual network.

Hosts 102 may also implement containers 114A-B (collectively referred to as 114) alongside VMs 112 or instead of VMs 112. Containers 114 are lightweight virtualized functions that operate on the host operating system (OS), optionally through a container interface (e.g., a container engine). The containers 114 may provide similar functions as NVEs 110.

VMs 112 and containers 114 may be used in a virtualized network, where instead of using the host's storage, the VMs 112 and containers 114 use network storage via one or more network file sharing (NFS) protocols. Various NFS protocols may be used, including but not limited to Server Message Block (SMB), Common Internet File System (CIFS) Protocol, Internet Small Computer Systems Interface (ISCSI), or the like.

The network appliance 104 may be any type of switch, router, hub, or other networking hardware. The network appliance 104 connects the hosts 102 with the storage arrays 106 via respective storage switches 116A-B (collectively referred to as 116). A storage switch 116 is a switch put in front of the storage array 106 or inside the storage array 106 to make the storage products aware of the virtual network. If the storage switch 116 is put in front of the storage array 106, it may be referred to as a "gateway" switch. If the storage switch 116 is put in the storage array 106, it may be referred to as an "embedded" switch. The storage switch 116 may be software or hardware based, or some combination thereof. There is no intrinsic difference between software and hardware in aspects of functionality, but only difference in management, performance, flexibility, etc.

A network controller 118 is used to manage the network resources in a data center and provide virtual network services to tenants through the network appliances 104 in the system. The network controller 118 interfaces with NVEs 110 to construct virtual networks. For instance, one or more VMs 112 or containers 114 may be grouped together and share a virtual network. NVEs 110 may be configured to route network traffic to certain VMs 112 or containers 114 to isolate VMs 112 or containers 114 into separate virtual networks. Each virtual network is identified with a Virtual Network Identifier (VNI). The network controller 118 may be centralized or distributed.

A software-defined storage (SDS) controller 120 is used to manage the storage resources in the operating environment 100. The SDS controller 120 provides storage services through the storage arrays 106 and storage switches 116 to the VMs 112 and containers 114 in the virtual network. The SDS controller 120 interacts with the network controller 118 to link the virtual storage resources of the storage arrays 106 into one or more virtual networks of one or more tenants of VMs 112 or containers 114, and to provide customized storage services to the tenants.

A compute controller 122 is used to manage the computing resources in the hosts 102, and to provide virtual machine services though the hypervisors 108 or container interfaces.

A security controller 124 is used to monitor the behaviors in the operating environment 100. The security controller 124 may establish policies, execute rules based on polices, and perform other functions to ensure the integrity of the hosts 102, storage arrays 106, networking appliances 104, and other components of the operating environment 100.

The combination of the network controller 118, SDS controller 120, compute controller 122, and security controller 124 is referred to as an "orchestrator" or "orchestrator system" 125. The orchestrator system 125 may be incorporated into a network node (e.g., host 102), network appliance (e.g., network appliance 104), gateway communicating with a number of devices that support virtualization operations, or other element on a local area or wide area network (e.g., an edge device, a switch, a terminal node, a peer node, a network router, a cloud service, etc.).

Hosts 102 and storage arrays 106 are connected in the physical network, which means that they may naturally communicate with each over the physical network, assuming there are no access controls. With overlay network virtualization techniques, different tenants may be separated into different virtual networks. For instance, VM1 112A and VM3 112C are in the same virtual network; VM2 112B and VM4 112D are in another virtual network (as depicted by the different dashed boxes around each group). To achieve this, each hypervisor 108 in the host 102 is equipped with an NVE 110 switch (may be both software and hardware), which is controlled by a dedicated network controller 118. In this scenario, VMs 112 hosted by the hypervisors 108 are located in different virtual networks, and each VM 112 may request file or block storage service (e.g., NFS/CIFS/ISCSI) from the storage array 106, which means that the storage array 106 is aware of the virtual network.

During operation, the storage array 106 detects an abnormal operating condition. The storage array 106 notifies the SDS controller 120. The SDS controller 120 may evaluate the condition and conditionally direct the storage array 106 to upload logs to an analytic platform 126.

The analytic platform 126 is used to analyze logs from various systems in the operating environment. The logs contain the input/output (I/O) operations of different tenants in the system. The I/O operations are associated with virtual network identifiers (VNIs) and virtual network addresses (e.g., virtual internet protocol (IP) addresses). Virtual network addresses may also be referred to as virtual host addresses (VHA). A process executing at the analytic platform 126 analyzes the logs and identifies tenants that are acting abnormally. The analytic platform 126 sends a <VNI, Virtual IP> pair to the security controller 124.

The security controller 124 evaluates the data received from the analytic platform 126. The security controller 124 may compare storage array access metrics to one or more thresholds, and depending on the outcome, interface with the compute controller 122, network controller 118, or the SDS controller 120 to address the situation. Storage array access metrics include, but are not limited to, accesses per period (e.g., per second, per minute, etc.), total number of accesses, and the like.

The network controller 118 is able to determine the network address of the host 102 and the NVE 110 that is hosting the VM 112 or container 114 with the virtual address provided by the security controller 124. The network controller 118 may install a network monitoring application at the NVE 110, for instance. The network monitoring application may capture and reroute network packets from the suspect VM 112 or container 114 for further analysis. The packets may be rerouted such that the user is unaware. Packets may be routed to an isolated network to avoid contaminating other tenants or networks.

The analytic platform 126 may analyze the captured packets. The analytic platform 126 analyzes the packets according to a predefined model and generates results. The results may be used as a feedback mechanism to update policies stored at the analytics platform 126 or security controller 124. For instance, the security controller 124 may adjust the behaviors, packet priorities, or other aspects of network communication of VMs 112 or containers 114 to maintain quality of service for other VMs 112 or containers 114.

Alternatively, the SDS controller 120 may use the results from the analytics platform 126 to adjust behaviors or policies of the storage switch 116 or storage array 106. For instance, if a storage system is overloaded, which influences the quality of I/O services to the tenants, the security controller 124 may command the SDS controller 120 to migrate a tenant's storage to another location.

Figure 2:
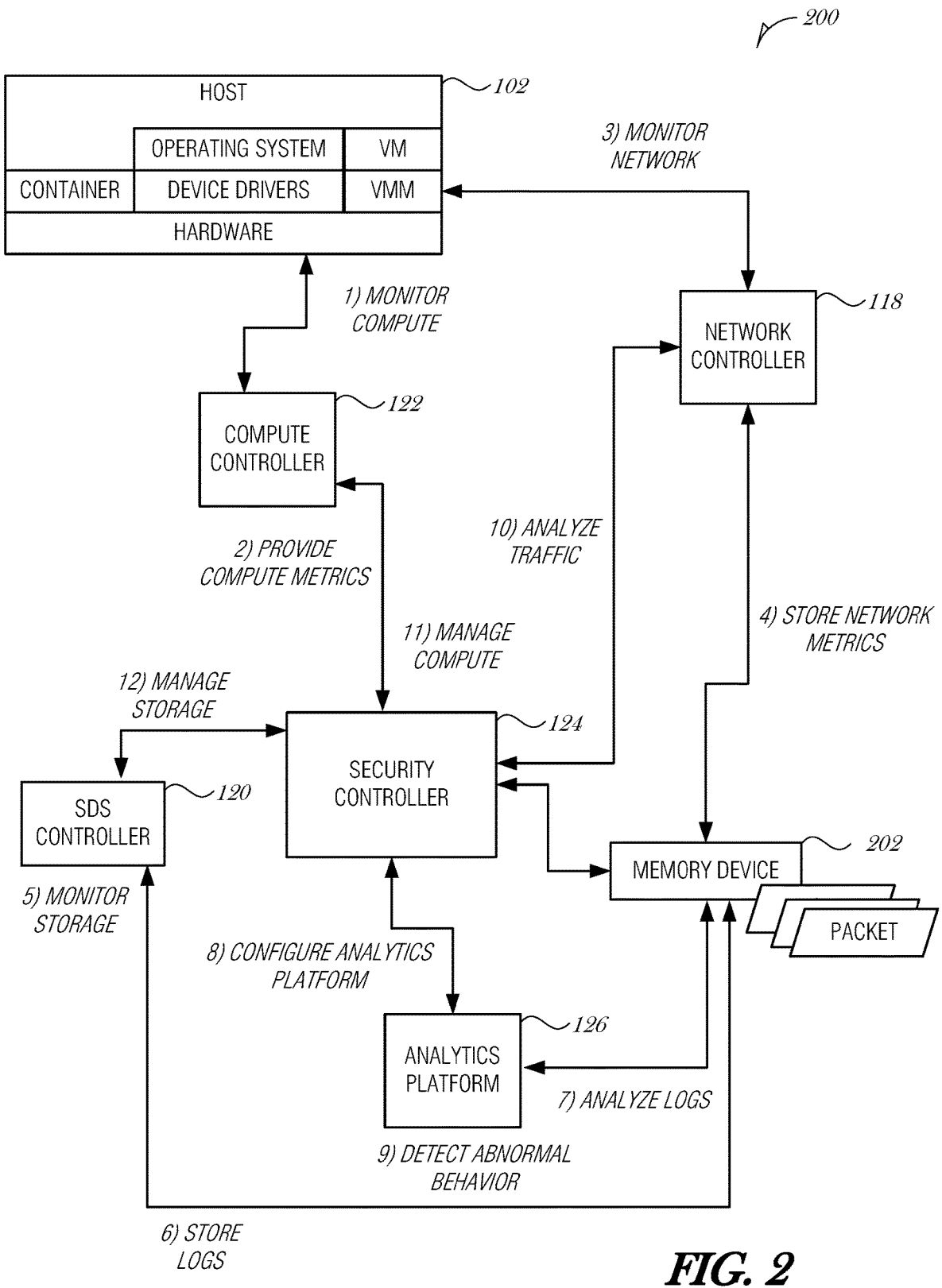
FIG. 2 is a data and control flow diagram illustrating the operations of a security controller, according to an embodiment.

FIG. 2 is a data and control flow diagram illustrating the operations 200 of a security controller 124, according to an embodiment. The security controller 124 operates based on various policies and rules. The security controller 124 aims to continually improve the QoS for storage systems. VM or containers may have QoS requirements on input/output (I/O). These I/O QoS requirements may be divided into at least the following aspects: 1) latency; 2) IOPS (I/O operations per second); and bandwidth. Latency may be used to refer to an average latency for I/O, a long tail latency for I/O (e.g., P99, P999, P9999, etc.), or the like. IOPS is a metric that measures the number of reads and writes to a storage device. Bandwidth refers to the bitrate, channel capacity, or throughput of a network communication path, whether it is a logical network or a physical network.

The security controller 124 implements rules and policies based on the principle of delivering high performance and monitored network availability to hosts. It leverages the compute controller 122, network controller 118, and SDS controller 120 to respectively monitor host resource utilization of the VM or container, the network packets of the VM or container, and the IOPS measurement of the storage system by the VM or container.

The compute controller 122 monitors processor-related resources, such as CPU utilization, memory footprint, etc. (Operation 1). The compute controller 120 may access or manage a CPU utilization log, a memory footprint log, etc., and provide metrics to the security controller 124 and analytics platform 126 (Operation 2). The metrics may be stored in a memory device 202 accessible to the security controller 124 and analytics platform 126.

The network controller 118 monitors network traffic and utilization (Operation 3). For storage QoS, the network controller 118 monitors the input and output packets owned by each VM or container to identify and monitor storage I/O related packets. The network controller 118 may store logs in memory device 202 so that the security controller 124 or analytics platform 126 may access the logs (Operation 4).

The SDS controller 120 monitors the IOPS, latency, and related logs of the VM, container, host, or other requesting agent (Operation 5). The storage metrics logs may be stored in the memory device 202 (Operation 6).

The analytics platform 126 analyzes the information collected by the compute controller 122, network controller 118, and SDS controller 120 (Operation 7). Logs from one or more of the compute controller 122, network controller 118, or SDS controller 120 may be stored in the memory device 202, which is accessible to the analytics platform 126.

The security controller 124 may configure the analytics platform 126 to determine what types of data to analyze, thresholds to use during analysis, and other rules for analysis (Operation 8). The analytics platform 126 is used to detect abnormal behavior of the VM or container based on metrics reflecting CPU utilization, memory utilization, network utilization, and storage utilization (Operation 9). These metrics are gathered by the compute controller 122, network controller 118, and SDS controller 120, respectively.

Based on the analysis provided by the analytics platform 126, the security controller 124 may perform one or more responsive actions. The responsive actions may include operations such as notifying an owner of a VM or container of the abnormal behavior, isolating and analyzing network traffic from a VM or container (Operation 10), isolating a VM or container in another compute environment (e.g., by migration), or shutting down a VM or container (Operation 11). The security controller 124 may also adjust behaviors or policies of the storage switch 116 or storage array 106 (Operation 12).

The analytics platform 126 is configured to further analyze the abnormal behavior and determine the underlying cause. Based on this analysis, the analytics platform 126 may adjust how the compute controller 122, network controller 118, or SDS controller 120 monitor and handle their respective resources.

Figure 3:
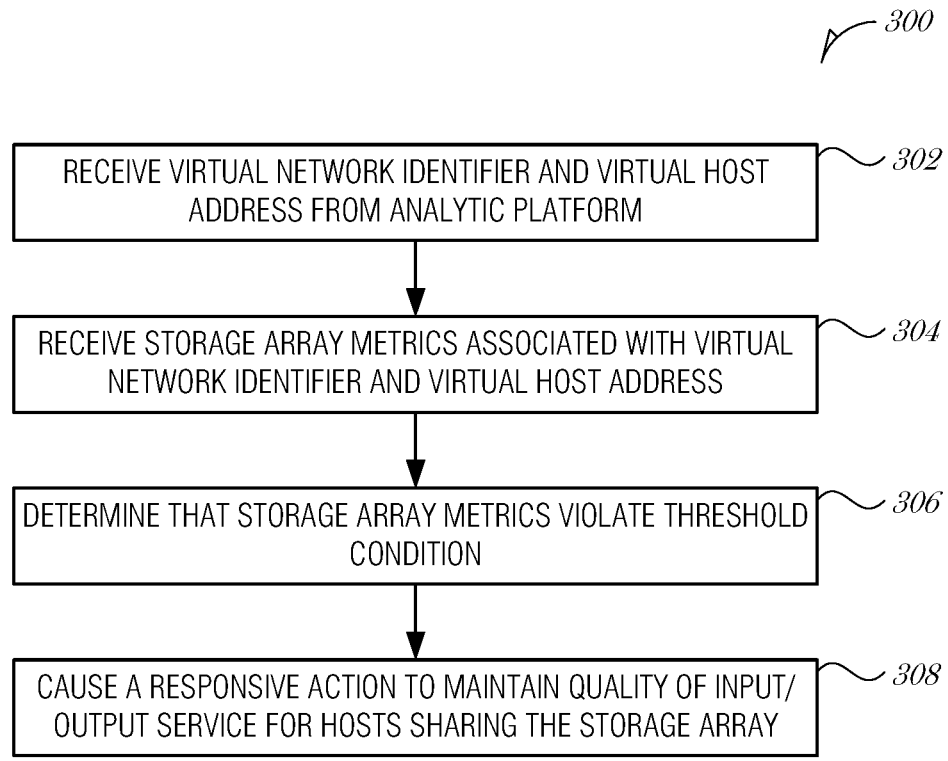
FIG. 3 is a flowchart illustrating a method for managing quality of storage service in a virtual network, according to an embodiment.

FIG. 3 is a flowchart illustrating a method 300 for managing quality of storage service in a virtual network, according to an embodiment. The method 300 may be performed by a processor-based machine, or an application executing on a processor-based machine, such as a security controller. The method 300 may be performed by any element in a network or coupled to a network including, but not limited to a network node (e.g., host 102), network appliance (e.g., network appliance 104), gateway communicating with a number of devices that support virtualization operations, or other element on a local area or wide area network (e.g., an edge device, a switch, a terminal node, a peer node, a network router, a cloud service, etc.).

At 302, a virtual network identifier (VNI) and a host virtual address (VHA) are received from an analytic platform. The VNI identifies the virtual network, the VHA identifies a virtual host on the virtual network. The analytic platform is configured to analyze input/output operations by the virtual host on a storage array in the virtual network. In an embodiment, the analytic platform is to aggregate storage array accesses from the virtual host at the storage array.

In an embodiment, the virtual host comprises a virtual machine. In a related embodiment, the virtual host comprises a container. In an embodiment, the VHA is a virtual Internet protocol address.

At 304, storage array metrics associated with the VNI and the VHA are received. In an embodiment, the storage metrics include a number of accesses in a period by the virtual host.

At 306, it is determined that the storage array metrics violate a threshold condition. In an embodiment, the threshold condition is a threshold number of accesses in a period by the virtual host.

At 308, a responsive action is caused to adjust the operating environment of the virtual host to maintain quality of input/output service for hosts sharing the storage array.

In an embodiment, causing the responsive action includes communicating the virtual network identifier and the virtual host address to a network controller, the network controller to monitor network traffic originating from the virtual host. With this information, the network controller is able to identify the VM or container that is operating abnormally. Thus, in a further embodiment, the network controller is to capture and reroute network packets from the virtual host for further analysis. In another embodiment, the network controller is to reroute the network packets from the virtual host to an isolated network, the isolated network separate from other virtual hosts on the virtual network.

In an embodiment, causing the responsive action includes communicating the virtual network identifier and the virtual host address to a storage controller, the storage controller used to manage the storage array and manage access to the storage array by the virtual host associated with the virtual host address. The storage controller may be a software defined storage controller. Similarly, responsive actions may be taken by the storage controller for the specific VM or container is acting badly. Thus, in an embodiment, the storage controller is to migrate the virtual host to a different location to maintain quality of input/output service of other hosts using the storage array.

In an embodiment, causing the responsive action includes communicating the virtual network identifier and the virtual host address to a compute controller, the compute controller used to manage compute resources on a physical host that is executing the virtual host. Similarly, the compute controller is able to help maintain a quality of I/O service by throttling compute use, moving a VM or container to a different compute platform on the same physical host or on a different physical host, or terminate the VM or container. Thus, in an embodiment, the compute controller is to migrate the virtual host to another compute environment to maintain quality of input/output service of other hosts using the storage array. In another embodiment, the compute controller is to terminate the virtual host to maintain quality of input/output service of other hosts using the storage array.

Along with managing compute, network, and storage aspects of the VM or container, the user may be notified or a log file may be created for a user to alert the user that the VM or container is acting abnormally. As such, in an embodiment, causing the responsive action includes communicating a notification to an owner of the virtual host.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 4:
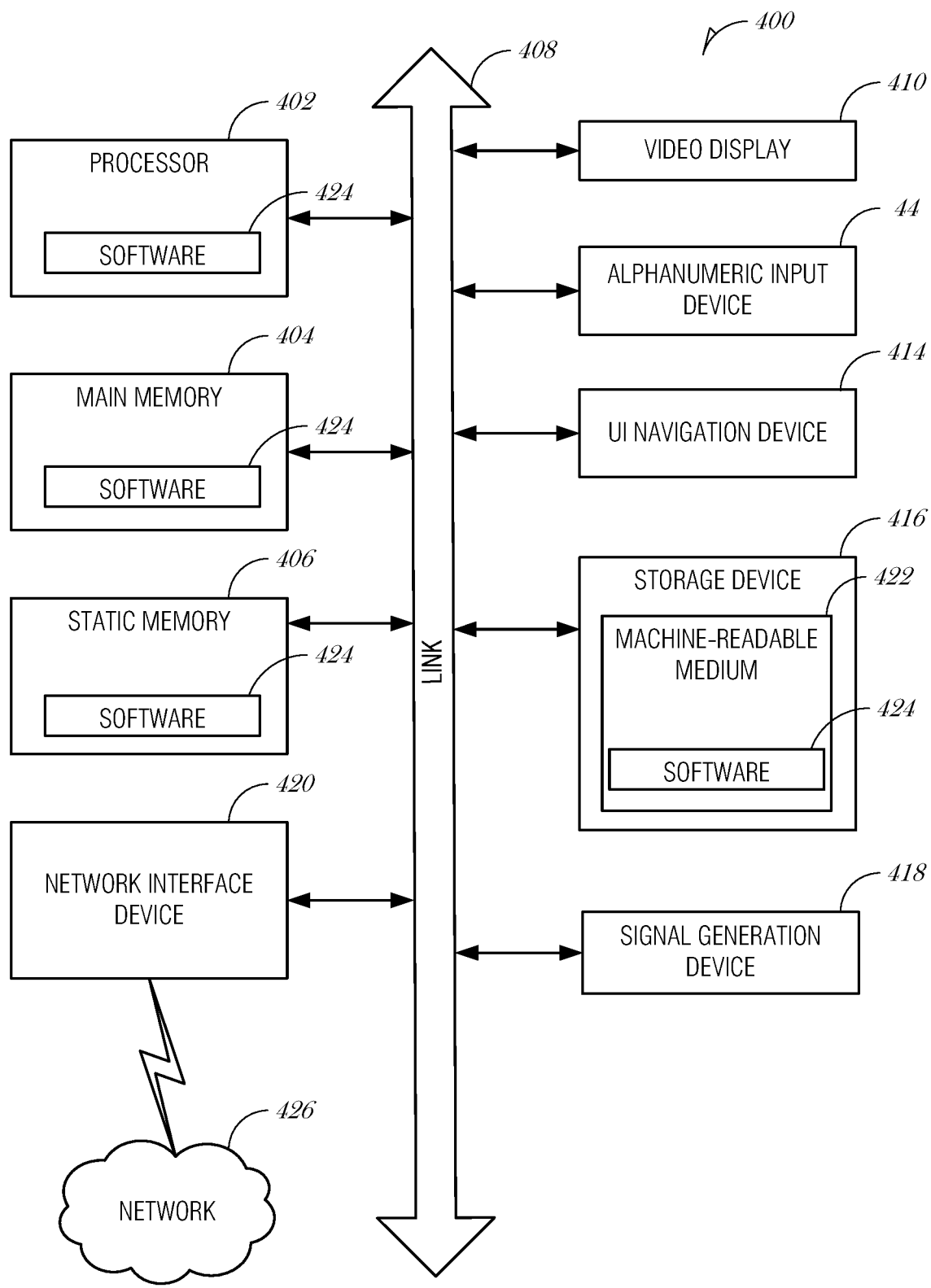
FIG. 4 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry 402 executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry 402 may be embodied as a stand-alone integrated circuit or may be incorporated as one of several components on an integrated circuit. In some embodiments, the various components and circuitry of the node 400 or other systems may be combined in a system-on-a-chip (SoC) architecture FIG. 4 is a block diagram illustrating a machine in the example form of a computer system 400, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 400 includes at least one processor 402 (e.g., a central processing unit (CPU), a graphics processing unit (GPU) or both, processor cores, compute nodes, etc.), a main memory 404 and a static memory 406, which communicate with each other via a link 408 (e.g., bus). The computer system 400 may further include a video display unit 410, an alphanumeric input device 412 (e.g., a keyboard), and a user interface (UI) navigation device 414 (e.g., a mouse). In one embodiment, the video display unit 410, input device 412 and UI navigation device 414 are incorporated into a touch screen display. The computer system 400 may additionally include a storage device 416 (e.g., a drive unit), a signal generation device 418 (e.g., a speaker), a network interface device 420, and one or more sensors (not shown), such as a global positioning system (GPS) sensor, compass, accelerometer, gyrometer, magnetometer, or other sensor.

The storage device 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404, static memory 406, and/or within the processor 402 during execution thereof by the computer system 400, with the main memory 404, static memory 406, and the processor 402 also constituting machine-readable media.

While the machine-readable medium 422 is illustrated in an example embodiment to be a single medium, the term "machine-readable medium" may include a single medium or multiple media (e.g., a centralized or distributed database, and/or associated caches and servers) that store the one or more instructions 424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include nonvolatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for managing quality of service in a virtual network, the system comprising: an analytic platform configured to analyze input/output operations by a virtual host on a storage array in a virtual network, the virtual host identified with a virtual network identifier (VNI), and the virtual network identified by a virtual host address (VHA); and a security controller to: receive, from the analytic platform, storage array metrics associated with the VNI and the VHA; determine that the storage array metrics violate a threshold condition; and cause a responsive action to adjust the operating environment of the virtual host to maintain quality of input/output service for hosts sharing the storage array.

In Example 2, the subject matter of Example 1 includes, wherein the VHA is a virtual Internet protocol address.

In Example 3, the subject matter of Examples 1-2 includes, wherein the virtual host comprises a virtual machine.

In Example 4, the subject matter of Examples 1-3 includes, wherein the virtual host comprises a container.

In Example 5, the subject matter of Examples 1-4 includes, wherein the analytic platform is to aggregate storage array accesses from the virtual host at the storage array.

In Example 6, the subject matter of Examples 1-5 includes, wherein the storage metrics include a number of accesses in a period by the virtual host.

In Example 7, the subject matter of Examples 1-6 includes, wherein the threshold condition is a threshold number of accesses in a period by the virtual host.

In Example 8, the subject matter of Examples 1-7 includes, wherein to cause the responsive action, the security controller is to: communicate the virtual network identifier and the virtual host address to a network controller, the network controller to monitor network traffic originating from the virtual host.

In Example 9, the subject matter of Example 8 includes, wherein the network controller is to capture and reroute network packets from the virtual host for further analysis.

In Example 10, the subject matter of Examples 8-9 includes, wherein the network controller is to reroute the network packets from the virtual host to an isolated network, the isolated network separate from other virtual hosts on the virtual network.

In Example 11, the subject matter of Examples 1-10 includes, wherein to cause the responsive action, the security controller is to: communicate the virtual network identifier and the virtual host address to a storage controller, the storage controller used to manage the storage array and manage access to the storage array by the virtual host associated with the virtual host address.

In Example 12, the subject matter of Example 11 includes, wherein the storage controller is a software defined storage controller.

In Example 13, the subject matter of Examples 11-12 includes, wherein the storage controller is to migrate the virtual host to a different location to maintain quality of input/output service of other hosts using the storage array.

In Example 14, the subject matter of Examples 1-13 includes, wherein to cause the responsive action, the security controller is to: communicate the virtual network identifier and the virtual host address to a compute controller, the compute controller used to manage compute resources on a physical host that is executing the virtual host.

In Example 15, the subject matter of Example 14 includes, wherein the compute controller is to migrate the virtual host to another compute environment to maintain quality of input/output service of other hosts using the storage array.

In Example 16, the subject matter of Examples 14-15 includes, wherein the compute controller is to terminate the virtual host to maintain quality of input/output service of other hosts using the storage array.

In Example 17, the subject matter of Examples 1-16 includes, wherein to cause the responsive action, the security controller is to: communicate a notification to an owner of the virtual host.

Example 18 is a method of managing quality of service in a virtual network, the method comprising: receiving a virtual network identifier (VNI) and a virtual host address (VHA) from an analytic platform, the VNI identifying the virtual network, the VHA identifying a virtual host on the virtual network, and the analytic platform configured to analyze input/output operations by the virtual host on a storage array in the virtual network; receiving storage array metrics associated with the VNI and the VHA; determining that the storage array metrics violate a threshold condition; and causing a responsive action to adjust the operating environment of the virtual host to maintain quality of input/output service for hosts sharing the storage array.

In Example 19, the subject matter of Example 18 includes, wherein the VHA is a virtual Internet protocol address.

In Example 20, the subject matter of Examples 18-19 includes, wherein the virtual host comprises a virtual machine.

In Example 21, the subject matter of Examples 18-20 includes, wherein the virtual host comprises a container.

In Example 22, the subject matter of Examples 18-21 includes, wherein the analytic platform is to aggregate storage array accesses from the virtual host at the storage array.

In Example 23, the subject matter of Examples 18-22 includes, wherein the storage metrics include a number of accesses in a period by the virtual host.

In Example 24, the subject matter of Examples 18-23 includes, wherein the threshold condition is a threshold number of accesses in a period by the virtual host.

In Example 25, the subject matter of Examples 18-24 includes, wherein causing the responsive action comprises: communicating the virtual network identifier and the virtual host address to a network controller, the network controller to monitor network traffic originating from the virtual host.

In Example 26, the subject matter of Example 25 includes, wherein the network controller is to capture and reroute network packets from the virtual host for further analysis.

In Example 27, the subject matter of Examples 25-26 includes, wherein the network controller is to reroute the network packets from the virtual host to an isolated network, the isolated network separate from other virtual hosts on the virtual network.

In Example 28, the subject matter of Examples 18-27 includes, wherein causing the responsive action comprises: communicating the virtual network identifier and the virtual host address to a storage controller, the storage controller used to manage the storage array and manage access to the storage array by the virtual host associated with the virtual host address.

In Example 29, the subject matter of Example 28 includes, wherein the storage controller is a software defined storage controller.

In Example 30, the subject matter of Examples 28-29 includes, wherein the storage controller is to migrate the virtual host to a different location to maintain quality of input/output service of other hosts using the storage array.

In Example 31, the subject matter of Examples 18-30 includes, wherein causing the responsive action comprises: communicating the virtual network identifier and the virtual host address to a compute controller, the compute controller used to manage compute resources on a physical host that is executing the virtual host.

In Example 32, the subject matter of Example 31 includes, wherein the compute controller is to migrate the virtual host to another compute environment to maintain quality of input/output service of other hosts using the storage array.

In Example 33, the subject matter of Examples 31-32 includes, wherein the compute controller is to terminate the virtual host to maintain quality of input/output service of other hosts using the storage array.

In Example 34, the subject matter of Examples 18-33 includes, wherein causing the responsive action comprises: communicating a notification to an owner of the virtual host.

Example 35 is at least one machine-readable medium including instructions, which when executed by a machine, cause the machine to perform operations of any of the methods of Examples 18-34.

Example 36 is an apparatus comprising means for performing any of the methods of Examples 18-34.

Example 37 is an apparatus for managing quality of service in a virtual network, the apparatus comprising: means for receiving a virtual network identifier (VNI) and a virtual host address (VHA) from an analytic platform, the VNI identifying the virtual network, the VHA identifying a virtual host on the virtual network, and the analytic platform configured to analyze input/output operations by the virtual host on a storage array in the virtual network; means for receiving storage array metrics associated with the VNI and the VHA; means for determining that the storage array metrics violate a threshold condition; and means for causing a responsive action to adjust the operating environment of the virtual host to maintain quality of input/output service for hosts sharing the storage array.

In Example 38, the subject matter of Example 37 includes, wherein the VHA is a virtual Internet protocol address.

In Example 39, the subject matter of Examples 37-38 includes, wherein the virtual host comprises a virtual machine.

In Example 40, the subject matter of Examples 37-39 includes, wherein the virtual host comprises a container.

In Example 41, the subject matter of Examples 37-40 includes, wherein the analytic platform is to aggregate storage array accesses from the virtual host at the storage array.

In Example 42, the subject matter of Examples 37-41 includes, wherein the storage metrics include a number of accesses in a period by the virtual host.

In Example 43, the subject matter of Examples 37-42 includes, wherein the threshold condition is a threshold number of accesses in a period by the virtual host.

In Example 44, the subject matter of Examples 37-43 includes, wherein the means for causing the responsive action comprise: means for communicating the virtual network identifier and the virtual host address to a network controller, the network controller to monitor network traffic originating from the virtual host.

In Example 45, the subject matter of Example 44 includes, wherein the network controller is to capture and reroute network packets from the virtual host for further analysis.

In Example 46, the subject matter of Examples 44-45 includes, wherein the network controller is to reroute the network packets from the virtual host to an isolated network, the isolated network separate from other virtual hosts on the virtual network.

In Example 47, the subject matter of Examples 37-46 includes, wherein the means for causing the responsive action comprise: means for communicating the virtual network identifier and the virtual host address to a storage controller, the storage controller used to manage the storage array and manage access to the storage array by the virtual host associated with the virtual host address.

In Example 48, the subject matter of Example 47 includes, wherein the storage controller is a software defined storage controller.

In Example 49, the subject matter of Examples 47-48 includes, wherein the storage controller is to migrate the virtual host to a different location to maintain quality of input/output service of other hosts using the storage array.

In Example 50, the subject matter of Examples 37-49 includes, wherein the means for causing the responsive action comprise: means for communicating the virtual network identifier and the virtual host address to a compute controller, the compute controller used to manage compute resources on a physical host that is executing the virtual host.

In Example 51, the subject matter of Example 50 includes, wherein the compute controller is to migrate the virtual host to another compute environment to maintain quality of input/output service of other hosts using the storage array.

In Example 52, the subject matter of Examples 50-51 includes, wherein the compute controller is to terminate the virtual host to maintain quality of input/output service of other hosts using the storage array.

In Example 53, the subject matter of Examples 37-52 includes, wherein the means for causing the responsive action comprise: means for communicating a notification to an owner of the virtual host.

Example 54 is at least one machine-readable medium including instructions for managing quality of service in a virtual network, the instructions when executed by processing circuitry, cause the processing circuitry to perform the operations comprising: receiving a virtual network identifier (VNI) and a virtual host address (VHA) from an analytic platform, the VNI identifying the virtual network, the VHA identifying a virtual host on the virtual network, and the analytic platform configured to analyze input/output operations by the virtual host on a storage array in the virtual network; receiving storage array metrics associated with the VNI and the VHA; determining that the storage array metrics violate a threshold condition; and causing a responsive action to adjust the operating environment of the virtual host to maintain quality of input/output service for hosts sharing the storage array.

In Example 55, the subject matter of Example 54 includes, wherein the VHA is a virtual Internet protocol address.

In Example 56, the subject matter of Examples 54-55 includes, wherein the virtual host comprises a virtual machine.

In Example 57, the subject matter of Examples 54-56 includes, wherein the virtual host comprises a container.

In Example 58, the subject matter of Examples 54-57 includes, wherein the analytic platform is to aggregate storage array accesses from the virtual host at the storage array.

In Example 59, the subject matter of Examples 54-58 includes, wherein the storage metrics include a number of accesses in a period by the virtual host.

In Example 60, the subject matter of Examples 54-59 includes, wherein the threshold condition is a threshold number of accesses in a period by the virtual host.

In Example 61, the subject matter of Examples 54-60 includes, wherein causing the responsive action comprises: communicating the virtual network identifier and the virtual host address to a network controller, the network controller to monitor network traffic originating from the virtual host.

In Example 62, the subject matter of Example 61 includes, wherein the network controller is to capture and reroute network packets from the virtual host for further analysis.

In Example 63, the subject matter of Examples 61-62 includes, wherein the network controller is to reroute the network packets from the virtual host to an isolated network, the isolated network separate from other virtual hosts on the virtual network.

In Example 64, the subject matter of Examples 54-63 includes, wherein causing the responsive action comprises: communicating the virtual network identifier and the virtual host address to a storage controller, the storage controller used to manage the storage array and manage access to the storage array by the virtual host associated with the virtual host address.

In Example 65, the subject matter of Example 64 includes, wherein the storage controller is a software defined storage controller.

In Example 66, the subject matter of Examples 64-65 includes, wherein the storage controller is to migrate the virtual host to a different location to maintain quality of input/output service of other hosts using the storage array.

In Example 67, the subject matter of Examples 54-66 includes, wherein causing the responsive action comprises: communicating the virtual network identifier and the virtual host address to a compute controller, the compute controller used to manage compute resources on a physical host that is executing the virtual host.

In Example 68, the subject matter of Example 67 includes, wherein the compute controller is to migrate the virtual host to another compute environment to maintain quality of input/output service of other hosts using the storage array.

In Example 69, the subject matter of Examples 67-68 includes, wherein the compute controller is to terminate the virtual host to maintain quality of input/output service of other hosts using the storage array.

In Example 70, the subject matter of Examples 54-69 includes, wherein causing the responsive action comprises: communicating a notification to an owner of the virtual host.

Example 71 is at least one machine-readable medium including instructions that, when executed by processing circuitry, cause the processing circuitry to perform operations to implement of any of Examples 1-70.

Example 72 is an apparatus comprising means to implement of any of Examples 1-70.

Example 73 is a system to implement of any of Examples 1-70.

Example 74 is a method to implement of any of Examples 1-70.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for managing quality of service in a virtual network, the system comprising:
   an analytic platform configured to analyze input/output operations by a virtual host on a storage array in a virtual network, the virtual host executing on a physical host computer and identified with a virtual network identifier (VNI), the physical host computer remote from the storage array and remote from the system for managing quality of service, and the virtual network identified by a virtual host address (VHA); and
   a security controller to:
      receive, from the analytic platform, storage array metrics associated with the VNI and the VHA, wherein the storage array metrics are computed from logs transmitted by the storage array when the storage array detects abnormal operating conditions;
      determine that the storage array metrics violate a condition; and
      cause a responsive action to adjust an operating environment of the virtual host to maintain quality of input/output service for hosts sharing the storage array.

2. The system of claim 1, wherein the VHA is a virtual Internet protocol address.

3. The system of claim 1, wherein the virtual host comprises a virtual machine.

4. The system of claim 1, wherein the virtual host comprises a container.

5. The system of claim 1, wherein the analytic platform is to aggregate storage array accesses from the virtual host at the storage array.

6. The system of claim 1, wherein the storage array metrics include a number of accesses in a period by the virtual host.

7. The system of claim 1, wherein the condition is a number of accesses in a period by the virtual host.

8. The system of claim 1, wherein to cause the responsive action, the security controller is to:
   communicate the virtual network identifier and the virtual host address to a network controller, the network controller to monitor network traffic originating from the virtual host.

9. The system of claim 8, wherein the network controller is to capture and reroute network packets from the virtual host for further analysis.

10. The system of claim 8, wherein the network controller is to reroute the network packets from the virtual host to an isolated network, the isolated network separate from other virtual hosts on the virtual network.

11. The system of claim 1, wherein to cause the responsive action, the security controller is to:
   communicate the virtual network identifier and the virtual host address to a storage controller, the storage controller used to manage the storage array and manage access to the storage array by the virtual host associated with the virtual host address.

12. The system of claim 11, wherein the storage controller is a software defined storage controller.

13. The system of claim 11, wherein the storage controller is to migrate the virtual host to a different location to maintain quality of input/output service of other hosts using the storage array.

14. The system of claim 1, wherein to cause the responsive action, the security controller is to:
   communicate the virtual network identifier and the virtual host address to a compute controller, the compute controller used to manage compute resources on a physical host that is executing the virtual host.

15. The system of claim 14, wherein the compute controller is to migrate the virtual host to another compute environment to maintain quality of input/output service of other hosts using the storage array.

16. The system of claim 14, wherein the compute controller is to terminate the virtual host to maintain quality of input/output service of other hosts using the storage array.

17. The system of claim 1, wherein to cause the responsive action, the security controller is to:
communicate a notification to an owner of the virtual host.

18. A method of managing quality of service in a virtual network, the method performed at an orchestrator system, the method comprising:
receiving a virtual network identifier (VNI) and a virtual host address (VHA) from an analytic platform, the VNI identifying the virtual network, the VHA identifying a virtual host executing on a physical host computer and the virtual host on the virtual network, the physical host computer remote from a storage array and remote from the orchestrator system, and the analytic platform configured to analyze input/output operations by the virtual host on the storage array in the virtual network;
receiving storage array metrics associated with the VNI and the VHA, wherein the storage array metrics are computed from logs transmitted by the storage array when the storage array detects abnormal operating conditions;
determining that the storage array metrics violate a condition; and
causing a responsive action to adjust an operating environment of the virtual host to maintain quality of input/output service for hosts sharing the storage array.

19. The method of claim 18, wherein causing the responsive action comprises:
communicating the virtual network identifier and the virtual host address to a network controller, the network controller to monitor network traffic originating from the virtual host.

20. The method of claim 19, wherein the network controller is to capture and reroute network packets from the virtual host for further analysis.

21. The method of claim 19, wherein the network controller is to reroute network packets from the virtual host to an isolated network, the isolated network separate from other virtual hosts on the virtual network.

22. The method of claim 18, wherein causing the responsive action comprises:
communicating the virtual network identifier and the virtual host address to a storage controller, the storage controller used to manage the storage array and manage access to the storage array by the virtual host associated with the virtual host address.

23. The method of claim 22, wherein the storage controller is to migrate the virtual host to a different location to maintain quality of input/output service of other hosts using the storage array.

24. At least one non-transitory machine-readable medium including instructions for managing quality of service in a virtual network, the instructions when executed by processing circuitry of an orchestrator system, cause the processing circuitry to perform the operations comprising:
receiving a virtual network identifier (VNI) and a virtual host address (VHA) from an analytic platform, the VNI identifying the virtual network, the VHA identifying a virtual host executing on a physical host computer and the virtual host on the virtual network, the physical host computer remote from a storage array and remote from the orchestrator system, and the analytic platform configured to analyze input/output operations by the virtual host on the storage array in the virtual network;
receiving storage array metrics associated with the VNI and the VHA, wherein the storage array metrics are computed from logs transmitted by the storage array when the storage array detects abnormal operating conditions;
determining that the storage array metrics violate a condition; and
causing a responsive action to adjust an operating environment of the virtual host to maintain quality of input/output service for hosts sharing the storage array.

25. The at least one machine-readable medium of claim 24, wherein causing the responsive action comprises:
communicating the virtual network identifier and the virtual host address to a storage controller, the storage controller used to manage the storage array and manage access to the storage array by the virtual host associated with the virtual host address.

* * * * *